(12) United States Patent
Xi et al.

(10) Patent No.: US 7,315,637 B2
(45) Date of Patent: Jan. 1, 2008

(54) IMAGE PROCESSING AND ANALYSIS OF ARRAY DATA

(75) Inventors: Xiongwu Xi, Dayton, NJ (US); Yiping Guan, North Plainfield, NJ (US)

(73) Assignee: BioArray Solutions Ltd., Warren, NJ (US)

( * ) Notice: Subject to any disclaimer, the term of this patent is extended or adjusted under 35 U.S.C. 154(b) by 738 days.

(21) Appl. No.: 10/893,007

(22) Filed: Jul. 16, 2004

(65) Prior Publication Data

US 2006/0013466 A1  Jan. 19, 2006

(51) Int. Cl.
  G06K 9/00 (2006.01)
  G06K 9/48 (2006.01)
  G06K 9/32 (2006.01)
  C12Q 1/00 (2006.01)

(52) U.S. Cl. .................. 382/128; 382/199; 382/296; 435/4

(58) Field of Classification Search ............... None
  See application file for complete search history.

(56) References Cited

U.S. PATENT DOCUMENTS

| | | |
|---|---|---|
| 5,627,040 A | 5/1997 | Bierre et al. |
| 6,498,863 B1 | 12/2002 | Gaidoukevitch et al. |
| 2002/0029235 A1 | 3/2002 | Lock et al. |
| 2002/0150909 A1 | 10/2002 | Stuelpnagel et al. |
| 2002/0197728 A1 | 12/2002 | Kaufman et al. |
| 2003/0087289 A1* | 5/2003 | Zuzan et al. .................. 435/6 |

FOREIGN PATENT DOCUMENTS

| WO | WO 02/35441 A2 | 8/2001 |
|---|---|---|
| WO | WO 02/37209 A1 | 8/2001 |

OTHER PUBLICATIONS

Written Opinion of the International Searching Authority.

* cited by examiner

Primary Examiner—Jingge Wu
Assistant Examiner—Charles Kim
(74) Attorney, Agent, or Firm—Eric P. Mirabel

(57) ABSTRACT

Disclosed are methods of processing images, and in particular aligning and orienting grids from a fluorescent array of signal sources, by linking nearest neighbor sources to form a hexagon, and then using the hexagon lines for alignment and orientation of the grid. Also disclosed are methods and algorithms for aligning image with grid and correcting for signal beads which are smaller than a grid field and the shift in a grid field. These methods can be used where the signal sources are fluorescent images from a microarray. Also disclosed are methods of automated watershed clustering following transformation.

4 Claims, 10 Drawing Sheets

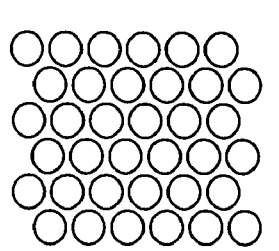
Fig. 3A Horizontal
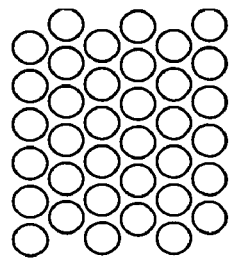
Fig. 3B Vertical
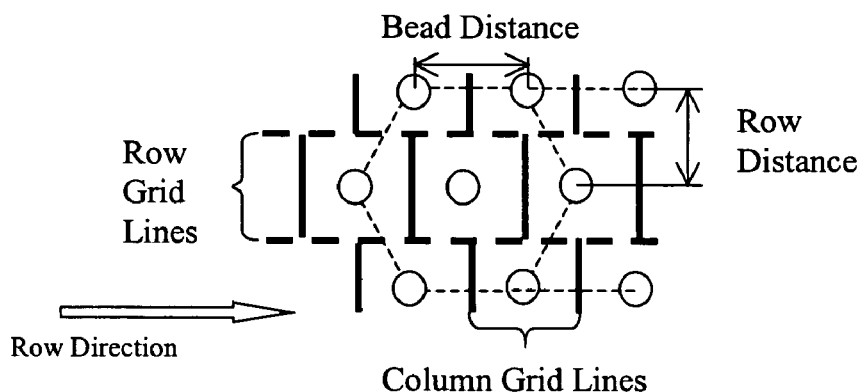
Fig. 3C
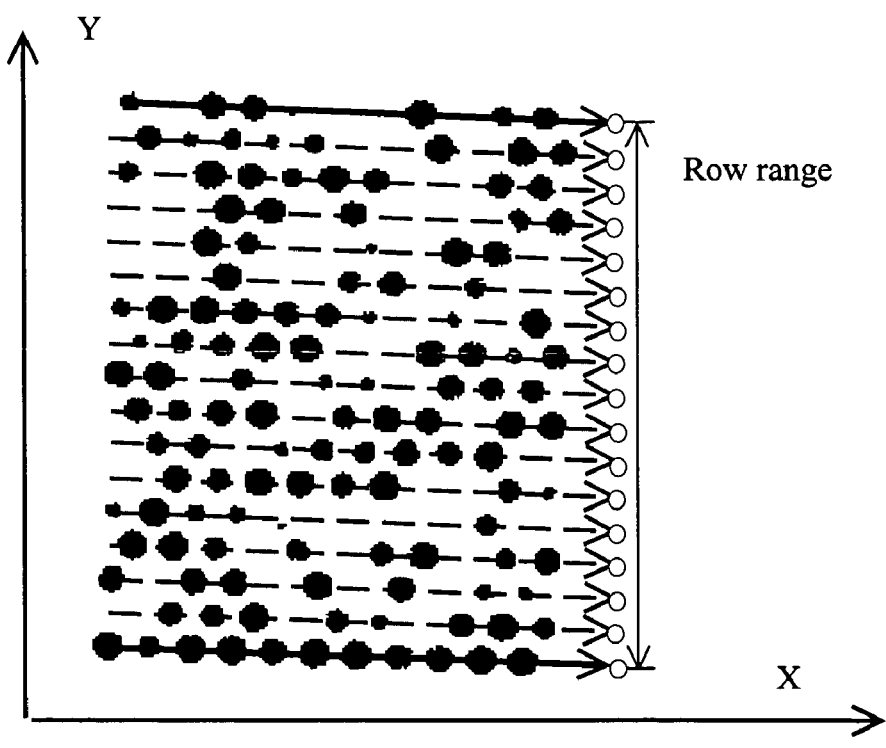
Fig. 4

Using Intensity Profile

Nomal

Using Edge Profile

Bad

Figure 8 – template bead map

Figure 9 – Image plot; each peak intensity has its own value

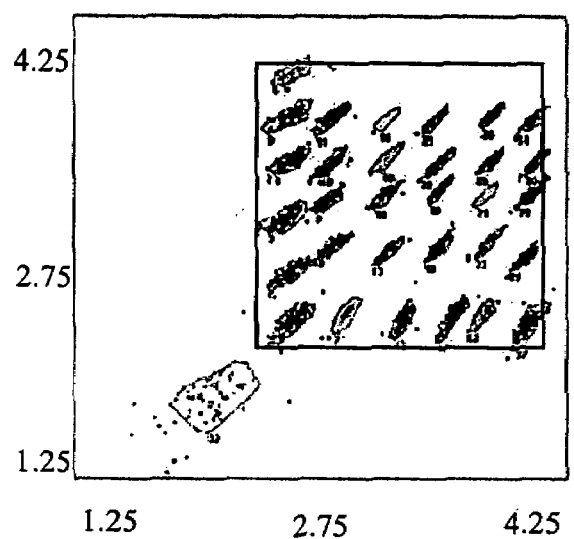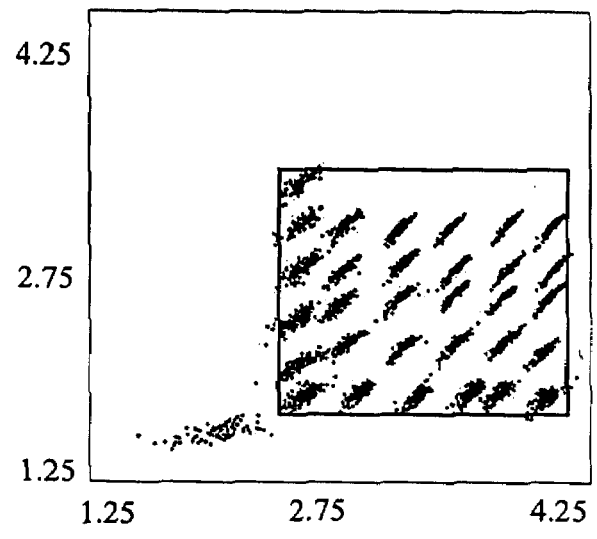
Template Bead Map
Fig. 11A
Project Bead Map
Fig. 11B

IMAGE PROCESSING AND ANALYSIS OF ARRAY DATA

BACKGROUND

Recent rapid advances in molecular biology have created more demand for high volume testing based on the need to screen ever larger compound libraries, validate ever increasing numbers of genetic markers and test ever more diversified patient populations. This has led to the development of new array formats, particularly for nucleic acid and protein-protein interaction analysis, which permit parallel processing by performing requisite assays in a "multiplexed" format.

Conventionally, such assays are performed by producing arrays of nucleic acids and antibodies by way of "spotting" or "printing" of aliquot solutions on filter paper, blotting paper or other substrates. However, notwithstanding their widespread current use in academic research for gene expression analysis and protein profiling, arrays produced by spotting have shortcomings, particularly in applications placing high demands on accuracy and reliability and calling for the analysis of a large volume of samples at high rates of throughput In another more recently developed technique, spatially encoded probe arrays are produced by way of in-situ photochemical oligonucleotide synthesis. However, this technology is limited in practice to producing short oligonucleotide probes—as a result, alternative technologies are required for the production of cDNA and protein arrays. In addition, in-situ synthersis precludes rapid probe array customization given the time and cost involved in the requisite redesign of the photochemical synthesis process.

In addition to these inherent difficulties relating to assay performance, spatially encoded arrays produced by spotting or in-situ synthesis conventional methods generally require specialized optical scanning instrumentation to extract data of useable quality. Commercial systems available for this purpose rely on confocal laser scanning—a slow process—even at the typically modest spatial resolution of ~5 µm—which must be repeated for each signal color.

In order to resolve many of the problems associated with diagnostic and analytical uses of "spotted arrays" of oligonucleotides and proteins (as outlined in "Multianalyte Molecular Analysis Using Application-Specific Random Particle Arrays," U.S. application Ser. No. 10/204,799, filed on Aug. 23, 2002; WO 01/98765), arrays of oligonucleotides or proteins arrays can be formed by displaying these capture moieties on chemically encoded microparticles ("beads") which are then assembled into planar arrays composed of such encoded functionalized carriers. See U.S. patent application Ser. No. 10/271,602 "Multiplexed Analysis of Polymorphic Loci by Concurrent Interrogation and Enzyme-Mediated Detection," filed Oct. 15, 2002, and Ser. No. 10/204,799 supra.

Microparticle arrays displaying oligonucleotides or proteins of interest can be assembled by light-controlled electrokinetic assembly (see, e.g., U.S. Pat. Nos. 6,468,811; 6,514,771; 6,251,691) or by a direct disposition assembly method (previously described in "Arrays of Microparticles and Methods of Preparation Thereof," filed Jul. 9, 2002; Ser. No. 10/192,352).

To perform nucleic acid or protein analysis, such encoded carrier arrays are placed in contact with samples anticipated to contain target polynucleotides or protein ligands of interest. Capture of target or ligand to particular capture agents displayed on carriers of corresponding type as identified by a color code produces an optical signature such as a fluorescence signal, either directly or indirectly by way of subsequent decoration, in accordance with one of several known methods. The identity of capture agents including probes or protein receptors (referred to herein sometimes also collectively as "receptors") generating a positive assay signal can be determined by decoding carriers within the array. See U.S. patent application "Multianalyte Molecular Analysis Using Application-Specific Random Particle Arrays" Ser. No. 10/204,799.

These microparticle ("bead") arrays generally contain a number of spectrally distinguishable types of beads within an area small enough to be viewed by a standard optical microscope. The small footprint and high signal contrast permit "instant" direct ("snapshot") multicolor imaging of the entire array under a microscope, thereby obviating the need for confocal laser scanning.

Analyzing the images recorded from such random encoded bead arrays involves several steps and issues, as described in U.S. patent application "ANALYSIS, SECURE ACCESS TO, AND TRANSMISSION OF ARRAY IMAGES" Ser. No. 10/714,203. To identify individual receptors scoring positive (and negative) in a given assay, the assay image comprising a pattern of signal intensities recorded from individual beads within the array is compared to a decoding image, taken before (or after) the assay. As described in detail in Ser. No. 10/714,203, this process is performed in an automated fashion by constructing a decoding map comprising groups ("clusters") of beads of the same type (displaying the same type of receptor). A rapid process for constructing the decoding map (also referred to as the "cluster map") is disclosed herein which invokes an adaptive template.

Determining the intensities of the individual beads in the assay image allows quantitation of results, for example, in gene expression or protein biomarker analysis. To determine bead signal intensities, the image is divided into segments by constructing a grid such that each field in the grid contains at most one bead—the intensities of the grid field intensities are then recorded. Because the grid finding step is performed on an image that is aligned within the viewing field, a first processing step is that of image rotation.

While the grid finding step can be performed on a bright field image (as described in Ser. No. 10/714,203), it is advantageous to eliminate the recording of a bright field image by instead finding the grid directly for decoding and assay images, typically comprising fluorescence images. In addition, the fluorescence image typically has a substantially higher contrast, that is, the ratio of signal to background. However, several problems must be overcome. First, beads displaying receptors which do not produce an assay signal will not be visible in the fluorescence image, and this generally will lead to the corruption of grid edges, thereby affecting the step of image rotation which relies on the accurate determination of the original image orientation by measuring the orientation of edges. Second, signal sources such as fluorescent beads may be randomly displaced from the center of each grid field, a fact which can affect the intensity recorded from that field.

SUMMARY

Disclosed are methods of automating the process of analysis in a manner that increases the confidence in the results of the analysis of assay data recorded in the form of images of arrays of signals representing the strength of receptor-ligand interactions; and more particularly, where different receptors are associated with different encoded microparticles ("beads"), and signals from "positive" beads represent the amount of ligand captured by the corresponding receptors displayed on such beads. The methods herein allow:

1. grid alignment by locating grid edges in such a fluorescence image;
2. segmentation by grid finding in a fluorescence image containing randomly distributed invisible ("dark") signal sources;
3. determination of the maximum intensity in a grid field, notwithstanding random lateral shifts of signal sources in the field; and
4. automatic clustering of signal sources of the same type, following transformation of the fluorescence image by use of an adaptive template.

BRIEF DESCRIPTION OF THE DRAWINGS

FIG. 3A depicts a bead array with horizontally aligned rows.

FIG. 3B depicts a bead array vertically aligned columns.

FIG. 3C depicts neighboring beads connected into a hexagon, and bead distance, row distance, and row and column grid lines.

FIG. 4 depicts row boundary lines on a grid.

FIG. 11A shows the bounding rectangle for the template bead map (showing the cluster type and position).

FIG. 11B shows the bounding rectangle for project bead map (showing only clusters, not their types, and their position).

DETAILED DESCRIPTION

I. Segmentation by Grid Finding in Misaligned Images of Arrays of Discrete Signal Sources Containing Randomly Placed "Dark" Sources The methods and algorithms set forth below address the problem of segmenting an image of an array of discrete signal sources which generally will be misaligned and will be composed of randomly interspersed "bright" and "dark" sources.

Figure 1:
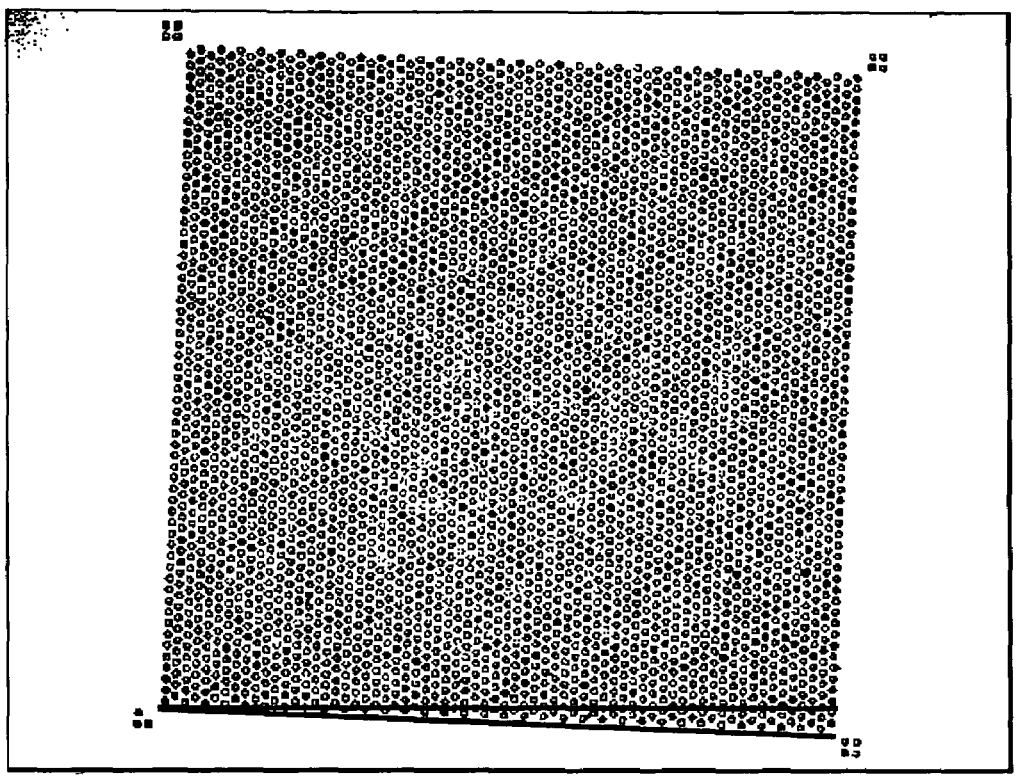
FIG. 1 is a decoding image of an array of bead signal sources.

Image Misalignment—As illustrated in FIG. 1, an array within an assay or decoding image generally will not be perfectly aligned with the axes defining the image frame. Instead, the array may be misaligned by a slight angle which typically can vary from 0° to about 10°, given the condition that all four edges must remain within the field frame. The angle between the lower horizontal edge of the array and the horizontal edge of the frame is defined as the orientation angle of the array. To find the grid, one must first find the orientation angle.

Randomly Placed "Dark" Sources—In the processing of images of signals from arrays, a critical step is to generate a grid having a number of fields, where a field contains a distinct signal source. Fluorescence images such as those shown in the examples herein are recorded using color filters and generally have high contrast which significantly exceeds that of a "brightfield image," which, as described in Ser. No. 10/714,203, is used for decoding.

Figure 2:
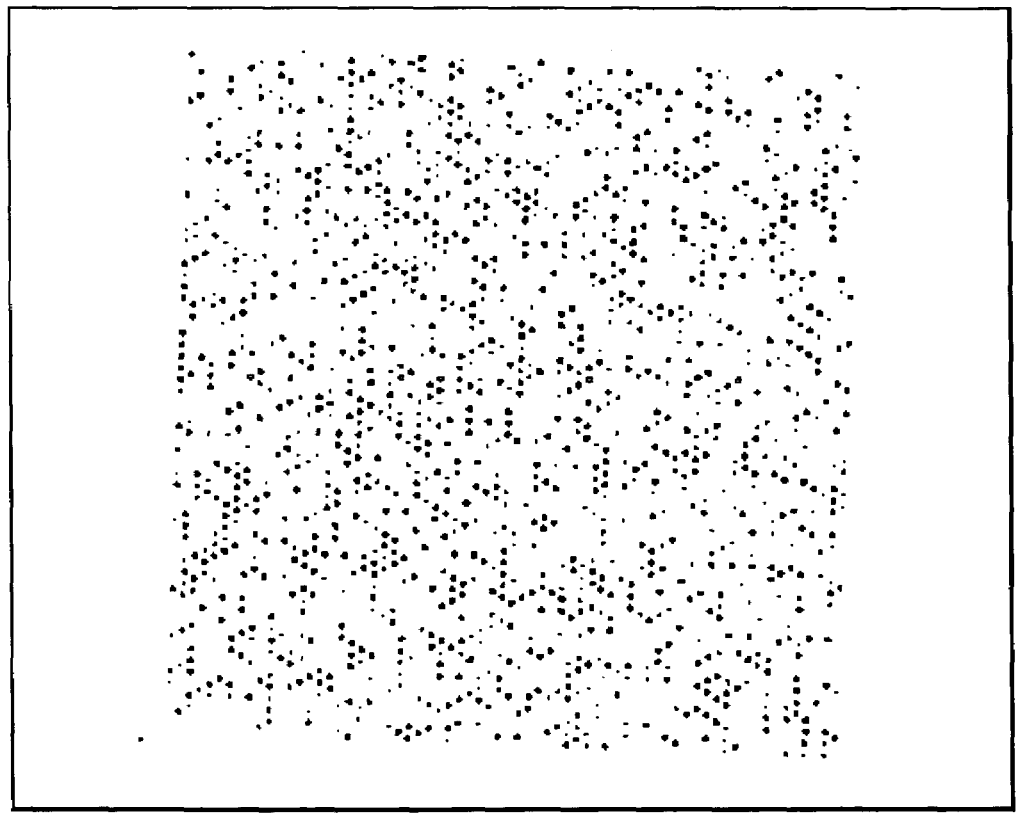
FIG. 2 is fluorescent image of an array of bead signal sources, e.g., that shown in FIG. 1, where only certain beads are fluorescent and therefore visible.

However, the problem in drawing a grid with fields around individual signal sources in an array of signal sources is that, in general, not all signal sources will be "on" when the grid is being drawn. For example, where the signals are fluorescence signals indicating a positive assay score (i.e., a receptor-ligand interaction), and signal sources are distinct beads in an array of such beads, only those bead scoring positive will be visible, the remainder, randomly distributed throughput the array, will be invisible (see FIG. 2). A method and algorithm to address this problem are set forth below.

I.1 Segmentation of Images of Source Arrays of Hexagonal Configuration—Certain embodiments of random encoded arrays use a set of mechanical traps to confine individual beads. In such embodiments, a hexagonal bead layout (FIG. 3C) provides a greater packing density than does a square layout and therefore is preferred. In a grid with hexagonal symmetry, all nearest neighbor distances are identical (see FIG. 3C).

If an array with horizontal lines is precisely aligned with respect to the horizontal axis of the frame (that is, with an alignment angle of 0°, as in FIG. 3C), then the lines forming the hexagon are oriented at 0°, 60°, and 120°, respectively, with respect to the horizontal. If the array is misaligned by a finite angle with respect to the horizontal, the lines of the hexagon are offset by 0°, 60°, and 120° from the array's angle of offset. One can therefore find the array orientation by finding the angle of offset of the hexagon. The hexagon perimeter can be found by connecting the centers of appropriate beads with their neighbors, as shown in FIG. 3C. A partitioning function was developed to partition all hexagon line angles into the three expected groups.

I.2 Algorithm for Forming a Grid in a Fluorescence Image of Signal Sources Containing Randomly Placed "Dark" Sources The main steps of finding a grid in an image of an array of fluorescence signal sources are as follows:
1. Process image before finding the hexagon lines;
2. In processed image, find bead centers, build hexagon lines, partition hexagon lines and find orientation angle;
3. Find row boundaries;
4. Find column boundaries;
5. Transform entire array into an alignment with image frame (zero orientation angle);

6. Find row grid lines in transformed array; and
7. Find column grid lines in transformed array.

A description of of how to perform each of these steps is set forth below.

Processing the Image Before Finding Hexagon Lines

The goals of image processing are:
  To reduce noise and false positive signals in the image;
  To place as many signal sources as possible in the image.

The following steps are used to process a fluorescence image:
  Reduce noise sources by blurring the image;
  Find the edges of the image;
  Thin the edges by erosion;
  Enhance the edges; and
  Convert the image into a binary image (i.e., each signal source position is either "on" or "off").

Finding the Array Orientation

The input parameters for finding the array orientation angle are:
  The binary image itself;
  The signal source (bead) size;
  Distance between two neighbor beads, or Bead Distance;
  Distance between rows, or Row Distance.

An array can be placed in a grid using one set of lines along the row direction and two sets of lines along the column direction (in order to account for beads which are offset from the lines). Given small variations in chip manufacturing and array imaging, actual distances between beads and distances between lines of beads generally will vary slightly, i.e., one cannot simply insert grid lines using "design" dimensions and these lines must be constructed explicitly from the image itself.

Using the binary image, one searches for positive signals, and then determines if a "blob" represents a signal source (such as a bead). A blob is designated as a source if its dimensions in both the x and y direction are close to the expected bead dimensions. When a bead is found, the position of its center is determined and stored in a list. As described herein further below, center positions can be refined as necessary in order to enhance the accuracy of the intensity value recorded from the grid field containing any given bead. From the list of bead center positions, one builds a list of all hexagon lines in the image by examining the relationship between every bead and the existing hexagon lines.

There are four types of possible relationships between beads and hexagon lines:
1. One bead is out of Bead Distance from any beads included in any existing hexagon.
   Result: the bead position is stored for including in a potential hexagon, to be determined. For ease of implementation, one can treat this bead as a special hexagon, which has one bead.
2. Two beads are neighbors and the distance between them is close to the Bead Distance.
   Result: A hexagon line is drawn between their centers (as shown in FIG. 3C).
3. One bead is on a hexagon line and it is a neighbor to a bead on the same line, but at a distal part of that line.
   Result: The hexagon line is extended and the bead is added at the end of the line (as shown in FIG. 3C).
4. One bead is not on a hexagon line, but it is a neighbor to one or two beads which are on a hexagon line.
   Result: New lines are added, connecting the bead, and the new lines are also added to the hexagon line list (as shown in FIG. 3C).

The algorithm for constructing the hexagon lines is outlined below.

```
For each bead center
{
    Get a line from existing hexagon line list
    {
        Check the relation of the current bead with this hexagon line.
        If the relation is any of 2 to 4 listed above
        {
            Update this hexagon line.
            Update hexagon line list.
        }
        If the relation is "1" from above, then
            store this bead as a hexagon line consisting of one bead.
    }
}
```

After constructing all hexagon lines, they are partitioned into groups according to misalignment angle, that is, the angle from the horizontal (and/or from the vertical) using a preset variance of each group (corresponding to acceptable variance in the orientation of the array) of +/−15°. There should be at least three groups of lines. This is so because, if all hexagon lines are included, the lines within each group can be oriented, respectively, at or near 0°, 60° and 120°. From the mean orientation angles of the set of lines in each of the three groups, one can determine the offsets from 0°, 60°, and 120°, respectively, and from this in turn the alignment of the array. To enhance efficiency and accuracy, the algorithm provides that any two hexagon lines that lie along the same line, be connected and merged into one longer line.

The partitioning function developed as part of this algorithm takes a set of data (the points that make up a line) and a preset variance for each group is determined, and the deviation in alignment of any line from the mean must be within the variance in order for that line to be included in the appropriate group. Below is a pseudocode description of this function.

```
For all data in the input data set
{
    Get a group from existing set of groups
    {
        Get distance of current data from mean of current group.
        If the distance is less than the standard variance size,
            add current data in the group; and
            update mean of that group.
        Else, try next group.
    }
    If current data doesn't fit in any group,
        create a new group with current data }
```

After sorting groups based on their size, the first three (largest) groups are designated as major line groups. Among those three major line groups, one should find one group of lines either close to 90° or close to 0°. That group is designated as a row group. The row group type determines whether the array has vertical lines of beads or horizontal lines of beads (see FIG. 3A and 3B). If a row group is close to 0°, then the array has horizontal lines or rows; if a row group is close to 90°, then the array has vertical lines, also referred to as vertical rows. The offset of a row group from 90° or from 0° is the alignment angle of the array.

Robustness of the Grid-Finding Algorithm

The bead occupancy in a fluorescent image may vary, and if the occupancy is too low, it may be difficult to construct the grid. One can simulate the effect of reducing occupancy, by starting with an image with sufficient bead occupancy to conduct an orientation calculation. The simulation then throws out the beads sequentially in a random manner and re-calculates orientation. The orientation angle is used to determine the robustness of the algorithm since it is a critical step in the algorithm.

Figure 13:
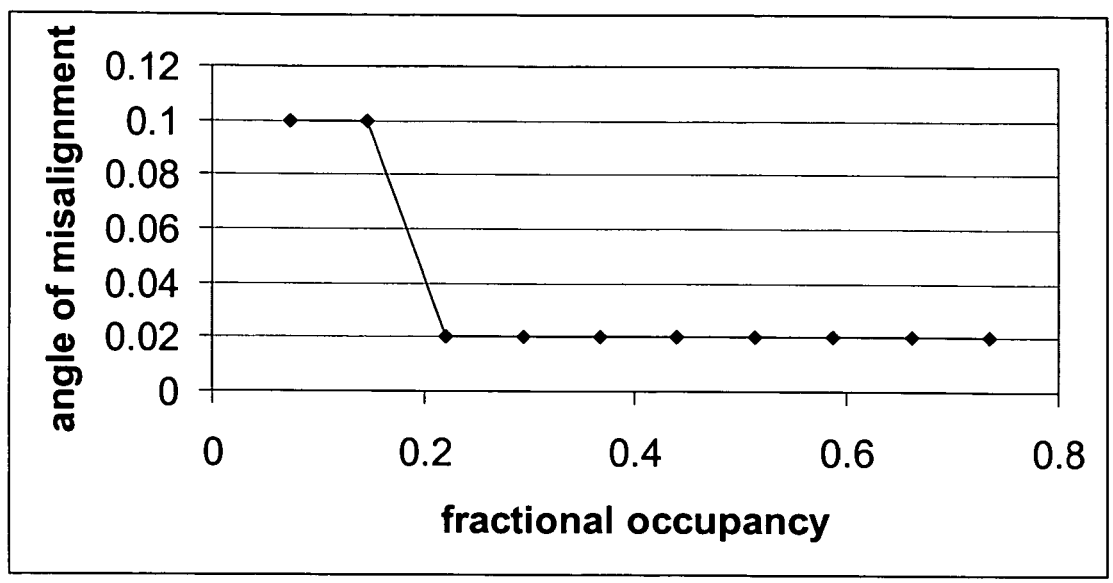
FIG. 13 plots angle of misalignment against fractional occupancy for an array of bead signal sources.

As illustrated in FIG. 13, the robustness of algorithm depends on the number of shining beads in a fluorescent image. The X axis of FIG. 13 represents fractional occupancy and the Y axis represents the angle of misalignment. There are a maximum of 4012 beads in an image. Starting at around 3000 beads, the misalignment is very small. As the bead number decreases further, the misalignment remains stable, until the occupancy drops to approximately 700/4012, at which point the algorithm fails. Since the algorithm looks at nearest bead neighbors to form hexagon lines, it depends on the hexagon lines for determining the orientation angle. A bead has maximum 6 neighbors. In theory, if all 6 neighbors are missing and one sixth of the beads remain, the algorithm will not be able to generate a hexagon line. In one image, there are a maximum 4012 beads, and one sixth of beads is about 700. The experiment, thus, agrees with the theoretical prediction.

For safety and precision, there should be at least 1000 beads for the successful segmentation of a grid when using a fluorescent image. In other words, the occupancy of image should be at least 25% to make algorithm work. Requiring 25% occupancy demonstrates that the method disclosed herein is indeed robust.

Finding Row Boundaries

To improve the accuracy of the process of locating array boundaries, the method disclosed here invokes a boundary box surrounding an array and then computes its orientation angle again and finds the center of the array.

In finding the box, one first looks for the first and the last rows in the array. The steps of finding them are:

1. Project all bead centers along the direction of rows;

```
For each bead center (x, y), compute its projected position (x, y), which
is the position in the array when at its orientation angle.
{
    Projected X = x + y * tan (Orientation Angle);
    Projected Y = y – x * tan (Orientation Angle);
}
```

Partition results of all projected (X, Y) positions into data groups;

If the rows are vertical, partition all projected x values into groups. If rows are horizontal, partition all projected y values into groups. Each group has a variance size of +/–(Projected Row Distance/3), where Projected Row Distance=Row Distance/cos (Orientation Angle).

Sort partitioned data groups, and find two boundary groups;

The conditions for a boundary group are:

(i) The group is at one end and has at least 4 bead centers;

(ii) Its distance to the next group is close to the Projected Row Distance.

These two conditions prevent one from selecting, by mistake, groups of noise as boundary groups.

On then checks the rest of the groups in projected rows between the two boundary groups and retains groups whose distance to their neighbors is close to the Row Distance.

To illustrate the above steps, an array is shown in FIG. 4 as an example. This array has 17 rows and 11 columns. Dark dots symbolize partitioned groups of projected centers. After finding the first row and the last row, one can draw the two row boundary lines, which are illustrated on the upper and lower perimeters in FIG. 4.

Finding Column Boundaries

Figure 5:
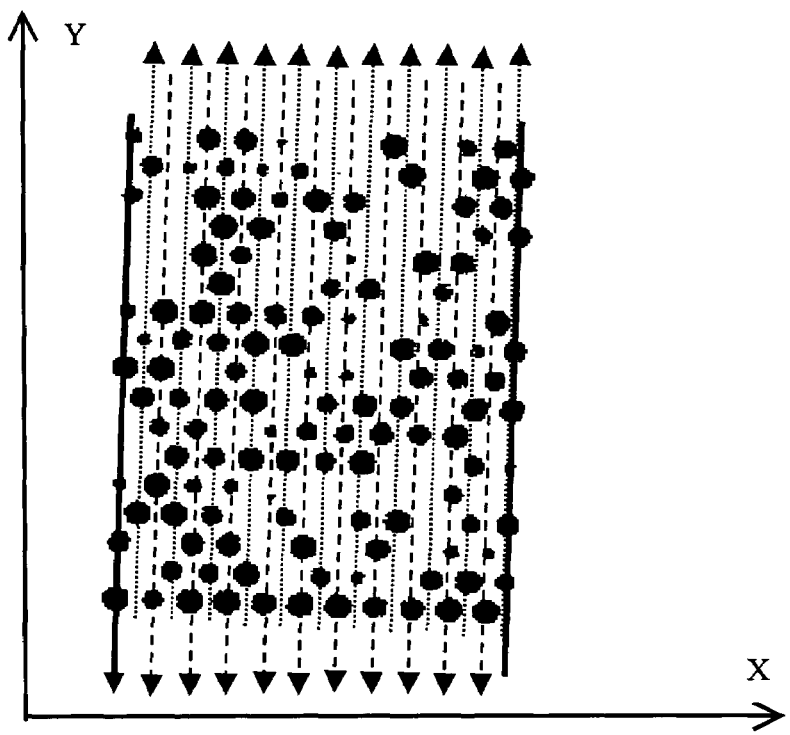
FIG. 5 shows bead centers separated into two groups, with one group containing beads from odd number rows, and the other, beads from even number rows.

After finding row boundaries, one separates bead centers into two groups. One group contains beads from rows of odd number counted in an ascending order of row positions, overlaid by dashed lines in FIG. 5, and the other group contains beads from rows of even number, overlaid by dotted lines in FIG. 5. For both groups of bead centers, one performs the following steps:

1) Project centers along the perpendicular direction of rows;
2) Collect all X values of projected centers if rows are horizontal, or collect all Y values of projected centers if rows are vertical; and
3) Partition collected values into groups. Each group has a variance size of +/–(Projected Bead Distance/3), where Projected Bead Distance=Bead Distance/cos (Orientation Angle).
4) Sort partitioned groups, find two boundary groups.
   The conditions for a boundary group are:
   (i) The group is an end group and has at least 3 bead centers;
   (ii) Its distance to the next group is close to Projected Bead Distance.
5) Check the remaining groups between the two boundary groups. Retain groups whose distance to their neighbors is close to the Bead Distance;

After the process, one has 4 boundary groups, each perpendicular to the direction of the rows. Within those 4 boundary groups, one retains the two groups that are column boundaries for all columns, as illustrated by the two vertical lines on the perimeter in FIG. 5.

Transforming Array Orientation into Alignment with External Frame

The next step is to transform the array so that the orientation angle is 0° to the horizontal. One first composes a rectangle around the image with two row boundaries and two column boundaries. Given the orientation angle (calculated above) and the center of the boundary rectangle (which is determined) one generates a transformation matrix to rotate the fluorescent image by the desired amount.

Find Row Grid Lines on the Transformed Array

To find grid lines which represent the boundaries of the fields between beads, one uses the bead centers determined in previous steps. But first, one transforms all bead centers inside the boundary rectangle by the same transformation used for rotating the array, to place them where desired.

Using transformed bead centers, one performs similar steps to those used in finding boundaries of the array before transformation. The steps are:

1. If rows of the array are vertical, then collect all values on the X axis of transformed bead centers in a set designated Row Positions. If rows of the array are horizontal, then collect all values on the Y axis of transformed bead centers in a set designated Row Positions;

2. Partition all data in the set of Row Positions into groups. Each group has a variance size of +/−(Row Distance/3);

3. Sort all groups in ascending order of group means. Remove groups where the distance to neighbor groups is not close enough to the Row Distance. Such removed groups could be "false positives" from noise, or could be "floating" beads (not affixed to the substrate on which the array is formed);

4. Check if there are any large gaps between groups. If so, one fills in an appropriate number of groups to effectively fill the gap;

5. Means of partitioned groups are positions of all rows. For every two rows, we compute the middle position as a grid line position between them. Thus, one obtains a list of grid lines with their positions in a sorted order; and 6. One extends the grid line list by adding two lines at both ends of each line in the list, at a Row Distance to the first and to the last grid lines, respectively.

Find Column Grid Lines in Transformed Array

After finding all row positions and their grid lines, one finds two sets of column grid lines. One first separates transformed bead centers into two groups. One group contains all beads from rows of odd numbers, counted in an ascending order of row positions, while the other group contains all beads from rows of even number.

For each group, one applies similar steps as those for finding grid lines for rows, but with data representing the different dimensions and distances between columns. At the end of the process, one has a set of row grid lines and two sets of column grid lines (the two sets of lines are offset from each other by half a grid width because of a staggered layout of the columns, (as shown in FIG. 3C)).

Once the grid is established for a fluorescent image, it should be aligned with fluorescent images from other color channels, to avoid having to establish a grid de novo for each fluorescent image.

II Image Alignment Using Edges; Aligning Other Grids Thereafter

Fluorescent images often reside in several color channels. For instance, an array on a single substrate can include green, orange and UV fluorescent images. Because of optical variations, there are shifts in the fluorescent images between different color channels. The shifts in the images are in the x, y directions, and are the shifts do not appear when the images are rotated. The images can be aligned with each other to eliminate these shifts.

Figure 6A:
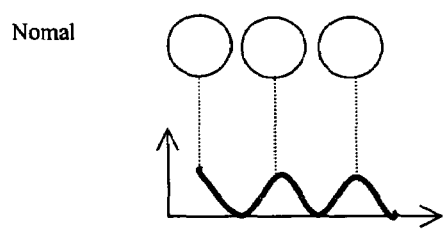
FIG. 6A shows finding the edge of the grid with bright beads, and that the peak of the intensity profile is at the bead center position.
Figure 6C:
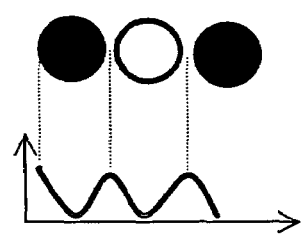
FIG. 6C shows finding the edge of the grid using a dark bead.
Figure 6B:
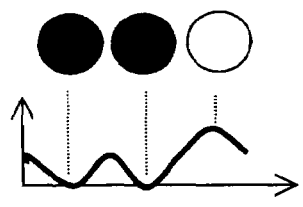
FIG. 6B shows that for dark beads, the peak intensity position is between the beads.

The algorithm below can be used to find the grid for one fluorescent image, and use the grid information for alignment with the other fluorescent images. The conventional algorithm used in grid-finding of a fluorescent image is based on finding the intensity profile for an array of fluorescent images. As noted above, and as illustrated in FIG. 6A to 6C, it does not work well for the images with many dark signal sources at the edges, as shown in FIG. 6C. As illustrated in FIG. 6A, the peak of the intensity profile is at the bead center position, for fluorescent beads as shown in FIG. 6A. But the peak intensity position for dark beads is between the beads, for dark beads as shown in FIGS. 6B and 6C. If many beads in the array are not lit up, the intensity peaks cannot be found, and the intensity peak profile will not always match the center positions of the fluorescent beads, causing alignment failure.

The edge profile of the array is determined by examining the difference between pixels near the edges of the array (the signal from each bead is made up of several pixels). No matter whether dark beads or lit beads are viewed, a peak always is present at the edge (see FIGS. 6A to 6C). Using this peak for alignment allows elimination of the effect of dark beads on alignment.

The pseudocode for the alignment algorithm is as follows:

```
FindColorGrid (ColorImage, Grid, RotAngle)    /** Find grid and
                                                  rotation from
                                                  fluorescence
                                                  image **/
FOR (each fluorescence image to be processed)
{
    LoadImage (Image);
    RotateImage(Image, RotAngle);             /** rotate the image to
                                                  get horizontal and
                                                  vertical configuration **/
    GenerateEdge (Image, EdgeProfile);
    AlignImage(EdgeProfile, Grid);            /** align edge profile
                                                  with grid image **/
}
```

Once the grid has been found and fluorescence images have been aligned, one can extract the intensity values from the different color channels to form a multi-dimensional scatter plot of signal source intensities collected from two or more color channels. The scatter plot is converted into a signal source map, one example being a decoding map, by an automated clustering algorithm described below.

III. Correcting for Shifts in Bead Position from the Center of a Grid Field, by Examining Region Where Intensity is Highest A signal source (e.g., a bead), when it is smaller than the grid field, can be displaced from the center of the field Such random lateral shifts in bead position within the grid fields can be corrected for in order to enhance the accuracy of the analysis.

One can view the intensity distribution across a single source such as bead within a given grid field through a window ("mask") that is placed onto each grid field, the mask generally chosen to be smaller than the grid field. If the bead is not located in the center of the grid field, viewing the intensity through the window will reduce the mean intensity computed from the set of discrete intensity readings for each mask pixel. As a result, the assay image or decoding image, and the corresponding source maps, will display regions of "false" reductions in intensity.

Figure 7:
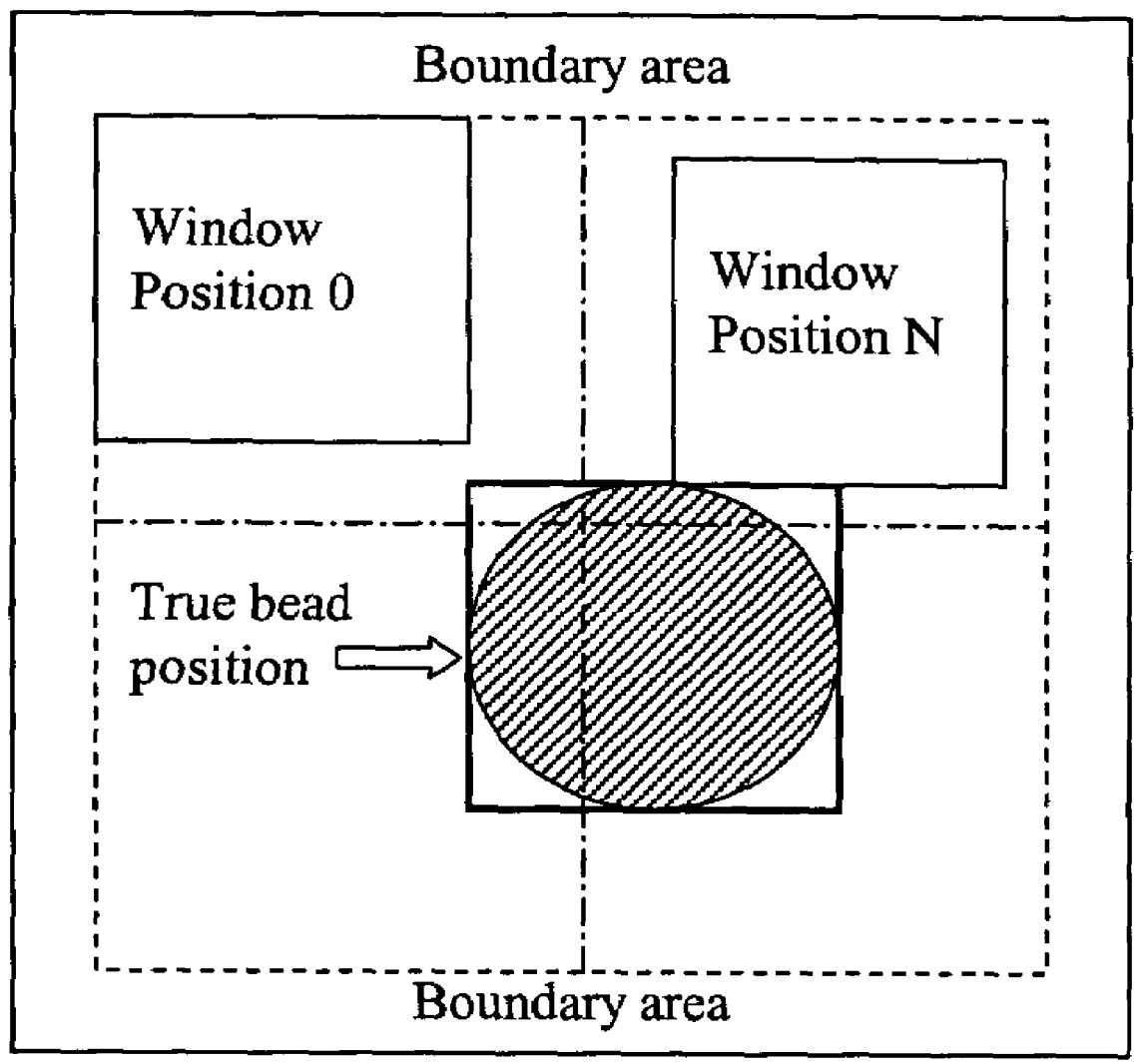
FIG. 7 shows the true bead position within a window and a boundary area around it.

The grid field with a window is illustrated in FIG. 7, where the large square defined in part by dotted lines indicates a grid field, and the window is defined within the grid field. The window is the size of the bead, and moves around the grid field to various positions. In FIG. 7, the window is drawn at position 0 and position N. The mean intensity of the all of the pixels within the window is calculated at each position. As shown in FIG. 7, when the window is over the true bead position, this provides the maximum intensity signal.

Note that the boundary region of the grid field in FIG. 7 is not included in the searching positions for the window, since the boundary region may have excess noise, caused by neighboring beads. Excluding examination of the boundary region, therefore, makes the algorithm more robust.

There is another pre-condition in using the window. If the bead intensity in a grid field is weak, the mean intensity at the center of the grid field will be used as the actual intensity. The reason for this adjustment is that weak beads are subject to interference from noise, especially near the grid field boundaries, and the center region of a grid field provides more consistent results.

A bead is determined to be weak if its intensity is below a dynamic threshold. The chip background intensity is first calculated by measuring mean intensity in the region outside the bead array. If the bead intensity is determined to be less than the background intensity by a specified percentage, the bead will be treated as a weak bead, and its intensity will only be measured at the center of the grid field.

```
GetBackgroundIntensity(Bintensity);
FOR(each grid cell in fluorescent image)
{
    EvaluateGridCellIntensity(OInensity);
    IF(OIntensity > Bintensity * 1.2)
    {
        /** move box around the grid cell and find the intensity. Note
        the 2 is the margin **/
        FOR(I=2; I<GridWidth-2; I++)
        {
            FOR(J=2; J<GridDepth-2; J++)
            {
                GetBoxAreaIntensity(I, J, BoxIntensity(I, J));
            }
        }
        /** the maximum intensity is the grid cell intensity **/
        FindMaxBoxAreaIntensity(BoxIntensity(I, J));
    }
    ELSE
    {
        /** Use the central box intensity for the weak grid **/
        GetCentralBoxIntensity( );
    }
}
```

Figure 8:
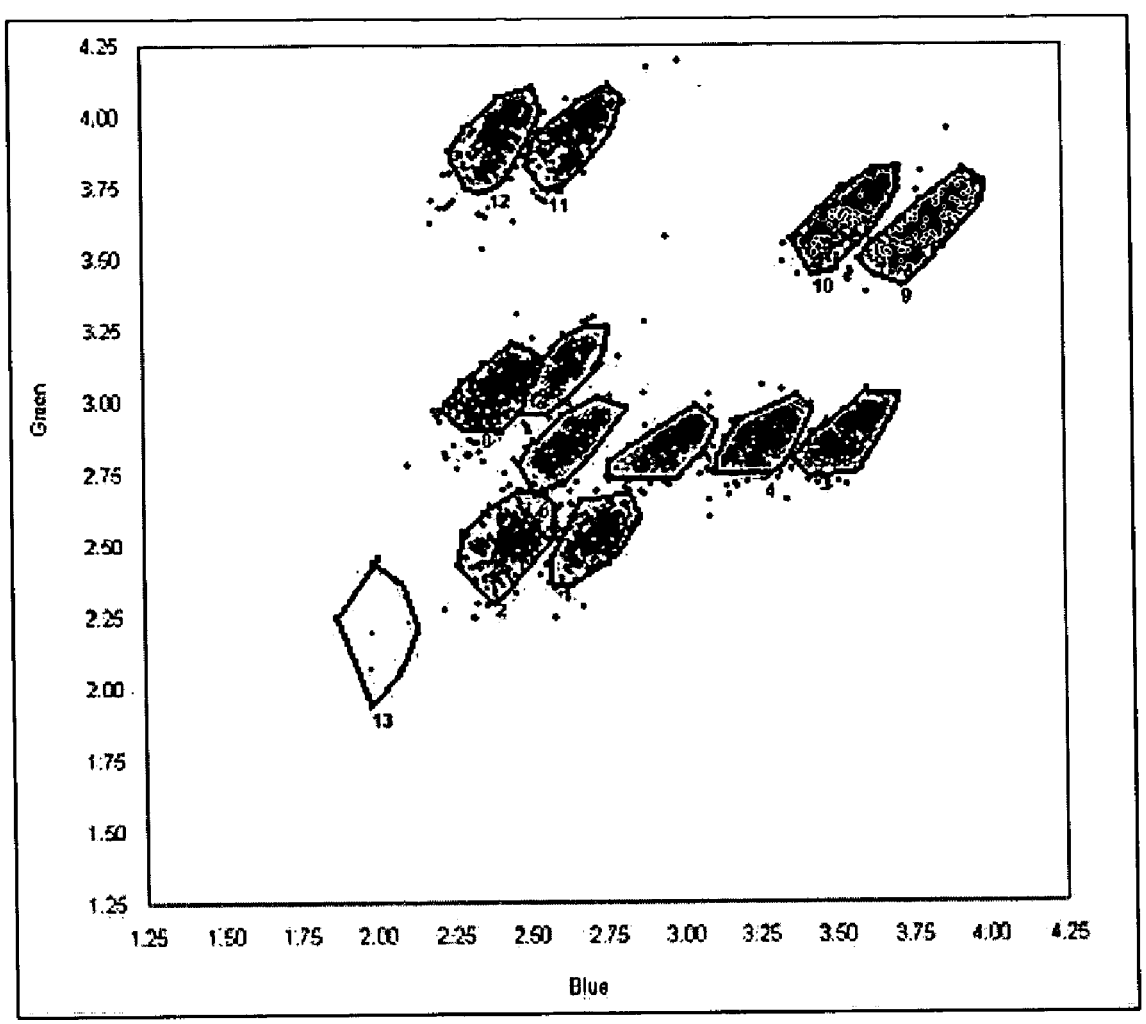
FIG. 8 represents a typical two-dimensional decoding map, collected using two color channels.

IV. Automated Watershed Clustering Following Transformation to an Image Format A critical step in the decoding of a signal source map in the form of an assay image is the construction of a decoding map by clustering of beads of identical type. A decoding map (also cluster map or bead map) is a multi-dimensional representation of groups of intensities representing the level of several encoding dyes within each bead; these intensities are recorded in two or more color channels. FIG. 8 is a typical two-dimensional decoding map, collected using two color channels.

Given a scatter plot of dots, each such dot representing an encoding intensity, a clustering operation groups dots located close to one another within the scatter plot into clusters which are assigned a number label. A decoding map contains, therefore, for each cluster, a position (e.g., that of the centroid) and a label.

To achieve high throughput in the decoding step, automatic clustering is essential. In automatic clustering one starts with a conventional decoding map and from that, generates a project decoding map template, with clusters in the same positions as the original map, but without labeling of clusters.

Converting a Decoding Map Into An Image Format for Automatic Clustering

In automatic clustering, one starts with a decoding map and converts it into an image format, and applies a watershed algorithm to that image in order to group beads by increasingly higher encoding intensities within the image. Within the image format, one can also apply image processing or filtering methods, for example to remove dots in the scatter plot which are regarded as "outliers."

Steps in the conversion process are:
1. Draw grid lines along both dimensions of the scatter plot bead map at the resolution desired (128 lines in both dimensions were used on FIG. 8);
2. For each grid field, compute the number of dots (i.e., signal sources including beads) from the scatter plot bead map falling in that grid field; and
3. Treat each grid field as a pixel and the number of dots inside that cell as pixel value.

Figure 9:
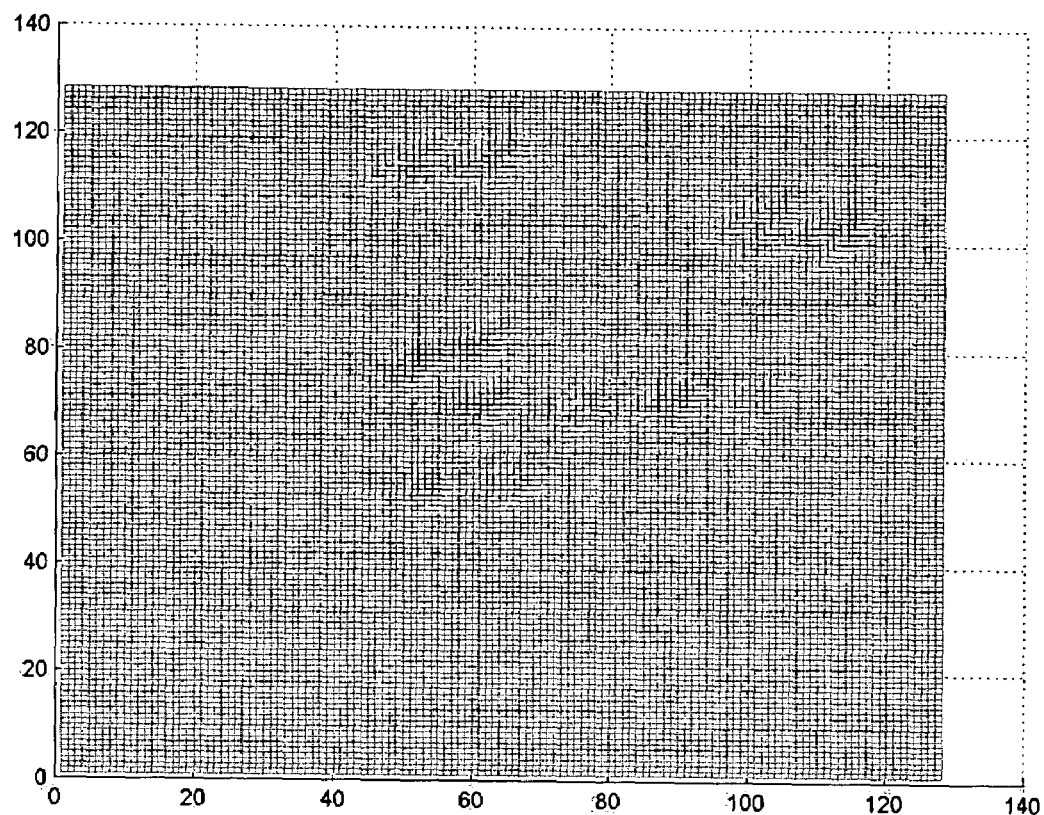
FIG. 9 shows the result of image conversion of the bead map in FIG. 8, when using a resolution of 128 grids in both dimensions.

FIG. 9 shows the result of image conversion of the bead map in FIG. 8, when using a resolution of 128 grids in both dimensions. Grids lighter in color indicate fewer dots, while darker color grids indicate more dots.

Watershed Algorithm: Clusters are Assigned a Number So That Their Location is Known The watershed method of finding intensity in an image is well known in image processing and described in, e.g., "Digital Image Processing," K. R. Castleman, Prentice hall press. It is used to find intensity levels by treating segments of different intensity levels of an image as basins of different depth. It then simulates rainfall on those basins until all basins are filled. The results of the watershed method are affected primarily by the starting position in each segment, before simulating rainfall. In this application, the starting position of a cluster shall be at or close to the central and the densest position of that cluster, in order to avoid erroneous results.

1. Find a Bounding Rectangle for the Bead Map

Figure 10:
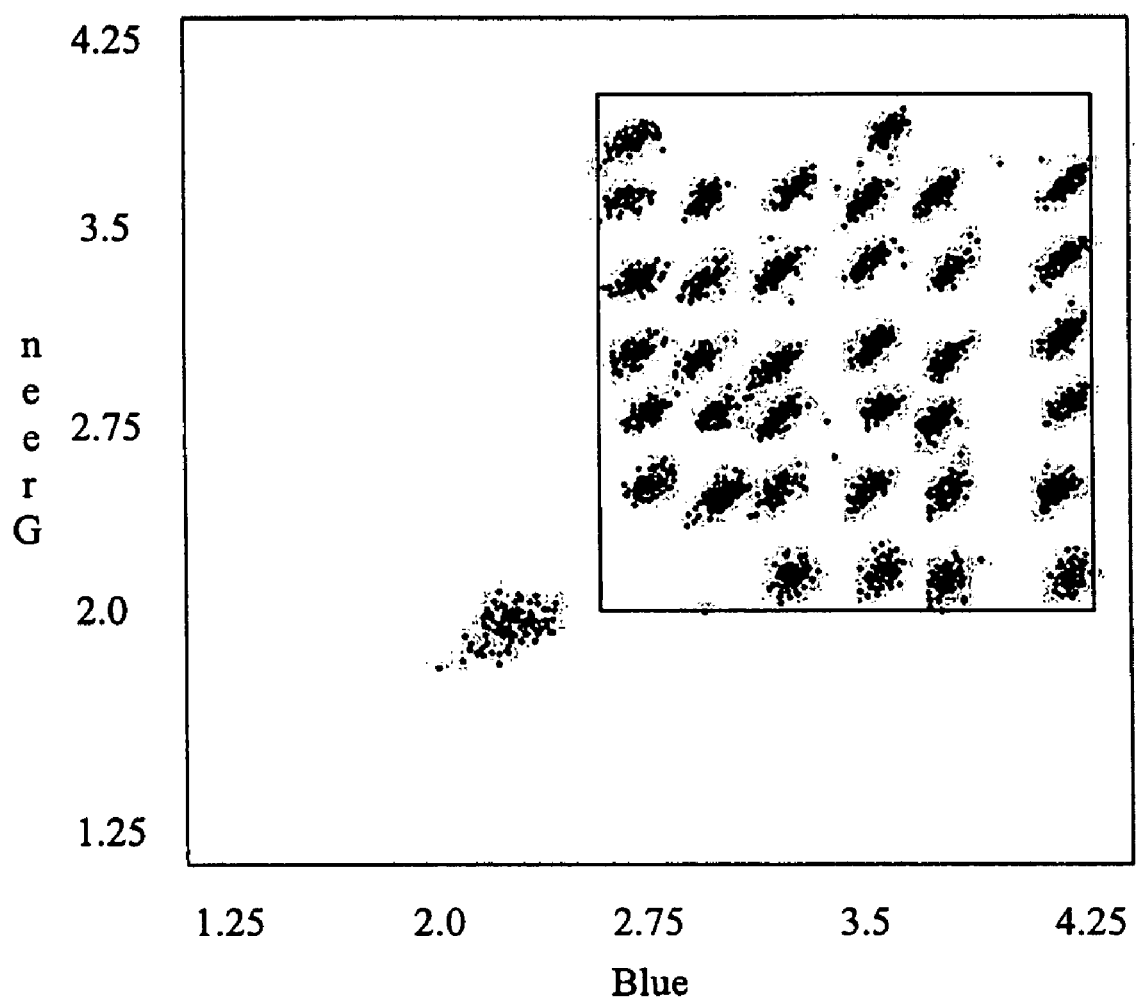
FIG. 10 shows a bead map can be enclosed in a perimeter.
Figure 12:
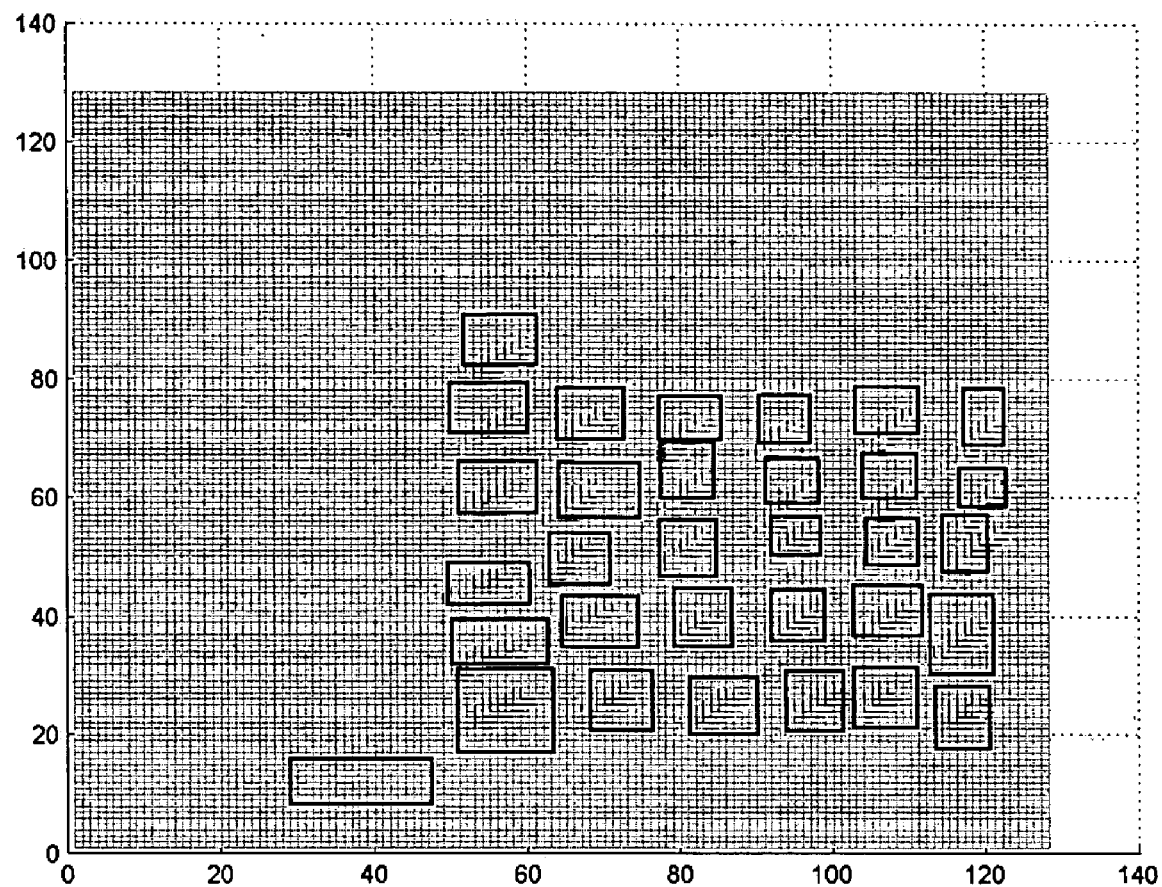
FIG. 12 shows the results after transforming the bounding rectangle for each cluster into an image format of a project bead map.

A bead map can be enclosed in a perimeter, e.g., box rectangle shown in FIG. 10. To enclose the bead map of FIG. 10, one finds a region which encloses all clusters, which, in this example, are clusters with positions are between 2.50 along the X axis and 4.25 along the Y axis. Clusters below 2.50 are generally from holes in the substrate on which the array is formed. The number of holes can vary greatly, and thus the region of the bead map below 2.5 is not stable and is not included in the computation. The steps for finding the bounding perimeter of a bead map are:
1. Convert the cluster region of the bead map (from 2.50 in the X direction to 4.25 in the Y direction in the bead map of FIG. 10), into an image;
2. Apply a smoothing filter technique to smooth the image and remove some noise; which is an image processing method, well known and described in, e.g., "Practical algorithms for image analysis," M. Seul, L. O'Gorman, M. J. Sammon;
3. Apply erosion, which is another image processing method, well known and described in, e.g., "Practical algorithms for image analysis," M. Seul, L. O'Gorman, M. J. Sammon, to remove weak edges around each cluster;
4. Find position range in both the X and Y dimensions of all pixels (where the signal from each bead is divided into several pixels), whose value is above a threshold of 5; which threshold is selected based on experience and testing; and 5. Make a rectangle box to cover the pixel position range in both the X and Y dimensions.

In FIGS. 11A and 11B the bounding rectangles are shown for, respectively, the template bead map (showing the cluster type and position) and project bead map (showing only clusters, not their types, and their position). The clusters in the project bead map end up lower down.

2. Transform One Decoding Map Into Another: Adaptive Templates

After finding bounding rectangles for both the template bead map and the project bead map, one can establish a transformation between the two bounding rectangles so that one can transform a point in the template bead map to a relative position in the project bead map. Assume here that one knows the bounding rectangle for a template bead map by its lower left corner (TLBx, TLBy) its width (TemplateW) and its height (TemplateH). And assume that one also knows the bounding rectangle in a project bead map by its lower left corner (PLBx, PLBy) its width (ProjectW) and its height (ProjectH). To transform a point (x, y) in template to a position (u, v) in project bead map, one uses the following formula:

$$u = PLBx + (x - TLBx)/TemplateW * ProjectW;$$

$$v = PLBy + (y - TLBy)/TemplateH * ProjectH.$$

One can also transform a point (u, v) from project bead map to a position (x, y) in a template with the following formula:

$$x = TLBx + (u - PLBx)/ProjectW * TemplateW;$$

$$y = TLBy + (v - PLBy)/ProjectH * TemplateH.$$

3. Convert Project Decoding Map Into Image Format

After obtaining the project bead map, it can be converted to an image format using the same techniques described above for converting a bead map and into an image format.

4. Transform Bounding Rectangle of Each Cluster

Here, each cluster in a template bead map is considered to be enclosed in a perimeter (here, a rectangular box). To define a cluster's bounding rectangle, one uses the position range of the dots which form the cluster. For each cluster in a template bead map, one transforms its bounding rectangle to an image format of a project bead map.

5. Locating Starting Point For Each Cluster

For each transformed bounding rectangle for each cluster, convert the interior region into a binary signal using a threshold of average pixel values in that region. Then find the biggest "blob" of image in the binary region. The center of the biggest blob is the starting point for that cluster.

6. Run Watershed Algorithm

Apply the watershed algorithm with the starting point of each cluster in the image format to find the intensity of the cluster. At the end of this process, each pixel either belongs to a specific cluster or to no cluster.

7. Convert Results From Image Format Back To Project Bead Map (Cluster Assignment of Each Dot in the Project Bead Map)

For each dot the image format, one must find the cluster it belongs to in the project bead map. To do so, one finds which pixel each dot belongs to in the image format. Then copy the cluster assignment of that pixel to that dot in the project bead map.

It should be understood that the terms, expressions and examples herein are exemplary and not limiting, and that the invention is defined only in the claims which follow, and includes all equivalents of the subject matter of the claims. The method steps in the claims are not necessarily in order, and unless specified in the claim, may be carried out in any order, including that specified in the claims.

What is claimed is:

1. A method of finding a grid from a fluorescent image of an array of signal sources, comprising:

finding the signal source centers;

building lines connecting neighboring signal sources into hexagons;

partitioning hexagon lines;

finding the orientation angle of the array;

finding row boundaries of the array;

finding column boundaries of the array;

transforming the entire array align at zero orientation angle with an image frame;

finding row grid lines on the transformed array;

finding column grid lines on the transformed array;

if the rows of the array are vertical, placing all X coordinates of transformed signal source centers into a set of row positions;

if rows of the array are horizontal, collecting all Y coordinates of transformed signal source centers into the set row positions;

partitioning the set of row positions into groups, where adjacent groups are within a first threshold distance;

calculating and sorting groups in order of group means;

removing groups where The distance to a neighbor group is within a second threshold distance;

determining if gaps between groups exceed the first threshold distance, and, if so, inserting an appropriate number of groups so that groups are within the first threshold distance from each other;

determining the respective relative positions of rows based on the mean of the member beads in the respective rows;

generating a set of grid lines such that member grid lines in the set are midway between adjacent rows; and adding one top line, parallel to the end lines and adjacent to the first row of the array, and adding one bottom line, parallel to the grid lines and adjacent to the last row of the array, said top and bottom lines being at a distance from the respective nearest grid line which is the same as the distance between adjacent grid lines.

2. The method of claim 1 further including separating transformed signal sources into two groups, where one of the groups contains signal sources from odd numbered rows, while the other group contains signal sources from even numbered rows.

3. The method of claim 2 further including finding two sets of column grid lines by separating transformed signal sources into two sets, where one set contains signal sources from odd numbered rows, and the other set contains signal sources from even numbered rows.

4. The method of claim 1 wherein individual signal sources are fluorescent beads.

* * * * *

UNITED STATES PATENT AND TRADEMARK OFFICE
CERTIFICATE OF CORRECTION

PATENT NO. : 7,315,637 B2
APPLICATION NO. : 10/893007
DATED : January 1, 2008
INVENTOR(S) : Xiongwu Xia and Yiping Guan It is certified that error appears in the above-identified patent and that said Letters Patent is hereby corrected as shown below:

Claim 1, column 14, line 20, after the word "array" and before "align", insert --to--
Claim 1, column 14, line 34, change "The" to --the--
Claim 1, column 14, line 45, change "end" to --grid--

Signed and Sealed this

Second Day of September, 2008

JON W. DUDAS
*Director of the United States Patent and Trademark Office*

UNITED STATES PATENT AND TRADEMARK OFFICE
CERTIFICATE OF CORRECTION

PATENT NO. : 7,315,637 B2  Page 1 of 1
APPLICATION NO. : 10/893007
DATED : January 1, 2008
INVENTOR(S) : Xiongwu Xia and Yiping Guan It is certified that error appears in the above-identified patent and that said Letters Patent is hereby corrected as shown below:

On title page item [75]
Correct spelling of first-named inventor's name from "Xiongwu Xi" to --Xiongwu Xia--.

Signed and Sealed this

Seventh Day of October, 2008

JON W. DUDAS
*Director of the United States Patent and Trademark Office*